US008181175B1

(12) United States Patent
McKee et al.

(10) Patent No.: US 8,181,175 B1
(45) Date of Patent: May 15, 2012

(54) ACCOUNTING FOR RESOURCE USAGE TIME BY A VIRTUAL MACHINE

(75) Inventors: Bret A. McKee, Fort Collins, CO (US); Robert D. Gardner, Fort Collins, CO (US); Chris D. Hyser, Victor, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 902 days.

(21) Appl. No.: 12/236,196

(22) Filed: Sep. 23, 2008

Related U.S. Application Data

(60) Provisional application No. 61/023,964, filed on Jan. 28, 2008.

(51) Int. Cl.
*G06F 9/455* (2006.01)
(52) U.S. Cl. ............................................. 718/1
(58) Field of Classification Search ................ 718/1
See application file for complete search history.

(56) References Cited

U.S. PATENT DOCUMENTS

| | | | | | |
|---|---|---|---|---|---|
| 5,023,771 | A | * | 6/1991 | Kishi | ............................ 710/260 |
| 5,898,855 | A | * | 4/1999 | Onodera et al. | ................... 718/1 |
| 5,975,739 | A | | 11/1999 | Katayama | |
| 6,152,439 | A | | 11/2000 | Hirayama | |
| 6,369,905 | B1 | | 4/2002 | Mitsuhashi | |
| 6,442,635 | B1 | | 8/2002 | Brightman | |
| 7,239,650 | B2 | | 7/2007 | Rakib | |
| 7,320,131 | B1 | * | 1/2008 | O'Toole, Jr. | ................... 718/104 |
| 7,840,962 | B2 | * | 11/2010 | Neiger et al. | ....................... 718/1 |
| 7,853,631 | B2 | * | 12/2010 | Ajiro | .............................. 708/110 |
| 7,895,597 | B2 | * | 2/2011 | Hartikainen | ................... 718/108 |
| 2003/0005417 | A1 | | 1/2003 | Gard | |
| 2003/0101440 | A1 | * | 5/2003 | Hardin et al. | ................. 717/148 |
| 2003/0115316 | A1 | * | 6/2003 | Yang-Huffman | ............. 709/224 |
| 2004/0267548 | A1 | * | 12/2004 | Jones | ................. 705/1 |
| 2006/0067166 | A1 | | 3/2006 | Murata | |
| 2006/0101466 | A1 | | 5/2006 | Kawachiya | |
| 2006/0130059 | A1 | * | 6/2006 | Bennett et al. | ..................... 718/1 |
| 2007/0028052 | A1 | | 2/2007 | Armstrong | |
| 2007/0067435 | A1 | | 3/2007 | Landis | |
| 2007/0140301 | A1 | | 6/2007 | Kailash | |
| 2008/0072232 | A1 | * | 3/2008 | O'Toole | ........................ 718/104 |
| 2009/0019442 | A1 | * | 1/2009 | Liu | ............... 718/102 |
| 2009/0169017 | A1 | * | 7/2009 | Smith et al. | ................... 380/278 |

FOREIGN PATENT DOCUMENTS

| | | |
|---|---|---|
| JP | 8044406 A | 2/1996 |
| JP | 2007034672 A | 2/2007 |

\* cited by examiner

*Primary Examiner* — Aimee Li

(57) ABSTRACT

A technique for accounting for resource usage time by virtual machines is provided according to which a virtual machine observes a non-virtual timer to determine an elapsed non-virtual time interval during which the virtual machine performed a computation while using a shared processing resource. The virtual machine infers the amount of time it used the shared processing resource based on the observation.

16 Claims, 3 Drawing Sheets

ACCOUNTING FOR RESOURCE USAGE TIME BY A VIRTUAL MACHINE

CROSS REFERENCE TO RELATED APPLICATIONS

This Application claims the benefit of U.S. Provisional Application Ser. No. 61/023,964, filed Jan. 28, 2008, titled "Accounting For Resource Usage Time By A Virtual Machine"

BACKGROUND

Virtual machines can be provided in a computer to enhance flexibility and performance. A virtual machine typically refers to some arrangement of components (software and/or hardware) for virtualizing or emulating an actual computer, where the virtual machine can include an operating system and software applications. Virtual machines can allow different operating systems to be deployed on the same computer, such that applications written for different operating systems can be executed in different virtual machines (that contain corresponding operating systems) in the same computer. Moreover, the operating system in a virtual machine (referred to as a guest operating system) can be different from the host operating system that may be running on the computer on which the virtual machine is deployed.

In addition, a greater level of isolation is provided between or among applications running in different virtual machines than is provided by running applications in a single virtual or physical machine. In some cases, virtual machines also allow multiple applications to more efficiently share common resources (processing resources, input/output or I/O resources, and storage resources) of the computer. Such sharing of hardware resources is performed by virtualizing the hardware resources with a virtual machine control entity, such as a hypervisor.

Because virtual machines share the physical resources, and in particular the processing resources, it may be desirable to account for the amount of time each virtual machine uses a particular resource. Time accounting is useful for several purposes, including scheduling and prioritization schemes, performance measurements, and customer billing. However, issues may arise with time accounting when the guest operating system is unaware that it is running in a virtual environment.

DETAILED DESCRIPTION

In accordance with some embodiments of the invention, a system includes plural physical machines having virtual machines running guest operating systems, with the system further including mechanisms for accounting for resource usage time while executing in a virtualized environment. "Time accounting" as used in this application refers to accounting for the amount of time each virtual machine uses a shared physical resource, for example, a processor resource. A "physical machine" refers to a machine that is an actual machine made up of software and hardware. A "virtual machine" refers to some partition or segment (made up of software and/or hardware) of the physical machine that is provided to virtualize or emulate a physical machine. From the perspective of a user, a virtual machine looks just like a physical machine.

Figure 1:
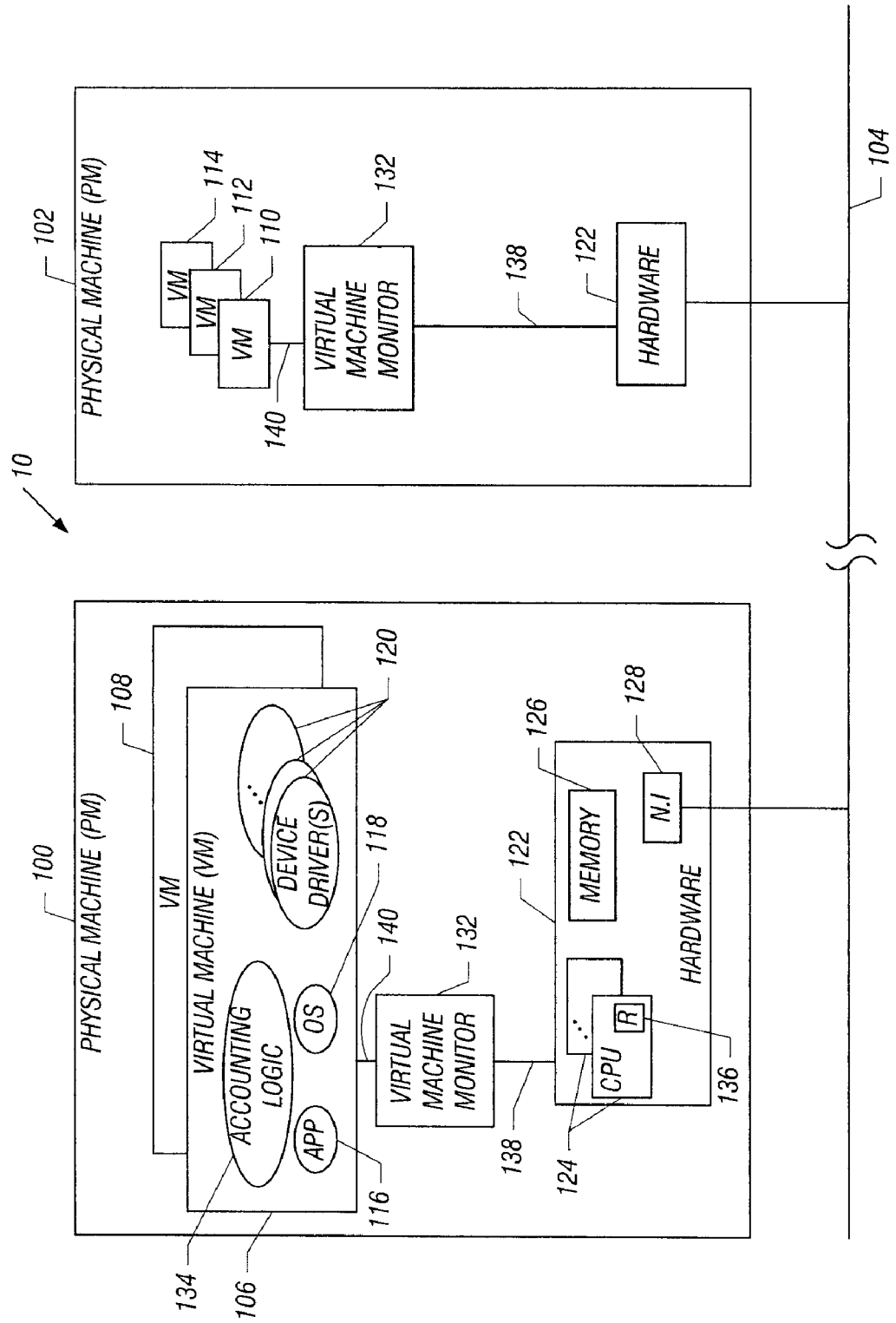
FIG. 1 is a block diagram of a system of physical machines on which virtual machines are deployed according to an embodiment of the invention.

Referring now to FIG. 1, a system 10 in accordance with the invention includes multiple physical machines 100, 102, which are interconnected by a network 104. The network 104 may include, for example, a local area network (LAN), a wide area network (WAN), the Internet or any other type of communication link. In addition, the network 120 may include system buses or other fast interconnects, which are not depicted in FIG. 1. The physical machines 100, 102 may be located within one cabinet (or rack), or alternatively, the physical machines 100, 102 may be located in multiple cabinets (or racks).

The system 10 shown in FIG. 1 may be any one of an application server farm, a storage server farm (or storage area network), a web server farm, a switch or router farm, etc. Although two physical machines 100, 102 are depicted in FIG. 1, it is understood that the system 10 may include more than two physical machines, depending on the particular application in which the system 10 is employed. The physical machines may be, for example, computers (e.g., application servers, storage servers, web servers, etc.), communications modules (e.g., switches, routers, etc.) and other types of machines. Although each of the physical machines is depicted in FIG. 1 as being contained within a box, a particular physical machine 100 may be a distributed machine, which has multiple nodes that provide a distributed and parallel processing system.

Each physical machine 100 provides a platform for various virtual machines. In the example of FIG. 1, physical machine 100 includes two virtual machines 106, 108, and physical machine 102 includes three virtual machines 110, 112, 114. In other implementations, each physical machine may contain fewer or more virtual machines depending on the particular application.

As illustrated in FIG. 1, and according to an exemplary embodiment of system 10, the virtual machine 106 includes one or more software applications 116, a guest operating system 118, and one or more device drivers 120 (which typically are part of the operating system 118). The other virtual machines 108, 110, 112, 114 shown in FIG. 1 may also include software applications, operating systems, and device drivers. It should be understood that the guest operating systems that are part of corresponding virtual machines within a physical machine can be different types of operating systems or different versions of an operating system. This allows software applications designed for different operating systems to execute on the same physical machine.

Certain virtual machines within a physical machine are designed to share the physical resources of the physical machine. For instance, in the physical machine 106, these physical resources include the hardware resources 122, which include one or more central processing units (CPUs) 124, memory (volatile memory and/or persistent storage, such as disk-based storage) 126, a network interface 128, and other resources (e.g., a storage area network interface (not shown)).

To manage sharing by the virtual machines of the hardware resources 122, a virtual machine monitor (VMM) 132 (e.g., a hypervisor) is provided. The VMM 132 virtualizes some of the hardware resources 122. Also, the VMM 132 intercepts requests for resources from the guest operating systems in the various virtual machines so that proper allocation of the physical resources of the physical machine 100 may be performed. For instance, the VMM 132 may manage memory access, I/O device access, and CPU scheduling for the virtual machines. Effectively, the VMM 132 provides an interface between the guest operating system of a virtual machine and the underlying hardware resources 122 of the physical machine 100 via communication paths 138 and 140. The interface provided by the VMM 132 to a guest operating system is designed to emulate the interface provided by the actual hardware of the physical machine 100.

To effectively manage the sharing of resources, the VMM 132 typically may implement a scheduling scheme according to which virtual machines are granted access to the resources. For instance, a virtual machine may be granted access to a resource based on a priority level that is assigned to its particular processing task. In situations where multiple virtual machines have requested access to a processing resource and all virtual machines have the same assigned priority, then the VMM 132 may schedule access to the resource by equally apportioning usage among the requesting virtual machines. It should be understood that other types of scheduling or prioritization techniques are envisioned and the foregoing scheduling techniques have been offered by way of example only. In any event, to implement the scheduling technique, the VMM 132 may track, or account for, the amount of resource time that each virtual machine uses.

Accounting for resource usage time may be useful for purposes other than scheduling. For instance, a customer or user of the system 10 may be billed for its usage of system 10 based on the amount of time the user's applications were actually running on system 10 and consuming shared resources. Time accounting also may be useful for performance and benchmark testing. However, customer billing, performance testing and resource scheduling when virtual machines are involved cannot be accurately implemented unless there is some mechanism for accounting for the actual time that a virtual machine is running and using the resources of the physical machine. For virtual machines that do not have a guest operating system that is aware that it is running in a virtual environment, resource usage time may not be accurately reported The issues with resource usage time accounting on a virtual machine occur as a result of the interaction between the time accounting technique employed by most operating systems and the virtualization of the system timer by the hypervisor. If guest operating systems are modified to recognize that they are running in a virtual environment, then the hypervisor may appropriately interact with the guest operating systems and accurately account for CPU usage. However, most common operating systems, such as Microsoft Windows and Linux, are not modified to recognize a virtual environment. In addition many of these common operating systems, such as Windows, cannot readily be modified because, for example, the operating system does not have an open source code.

Typically, commonly known operating systems keep track of time by incrementing a counter representing a time offset in response to the periodic ticking of an interval timer. In known systems implementing virtual machines, the hypervisor (e.g., VMM 132) generally is aware of this common method of tracking time and uses the method to virtualize a timer in a manner that allows the guest operating systems to keep time correctly over relatively long time intervals. More specifically, the hypervisor may virtualize a timer by keeping track of the last time a virtual timer tick was delivered to the virtual machine, and then delivering subsequent ticks at an accelerated rate while the virtual machine is running. Accelerating the tick rate while the virtual machine is running compensates for the non-virtual ticks that the virtual machine missed while it was not running. This technique allows the virtual machine to keep track of the actual passage of time. However, the technique also introduces a temporal distortion anomaly which results in the guest operating system reporting that it has been using the resources for the entire non-virtual time interval that is represented by the accelerated ticks.

As a result of this temporal distortion, processor usage may be overreported by the guest operating system in proportion to the number of running virtual machines. For instance, if the hypervisor is controlling four virtual machines, then the reported total processor usage during an interval in which each of the virtual machines ran for only a portion of the time may be four times larger than the actual processor usage during that interval due to the fact that each virtual machine has received accelerated ticks representing the entire time interval. Thus, the temporal distortion can create several problems, including overbilling customers for CPU usage, inaccurately measuring performance, and improperly scheduling or prioritizing sharing of resources among the various virtual machines. Indeed, this problem may become so severe that it may result in the guest operating system never scheduling an access request by a particular application.

To overcome these issues, and in accordance with some embodiments of the invention, a technique for accounting for resource usage time by a virtual machine is provided which does not require modification of the guest operating system. In accordance with this technique, accounting for resource usage time by a virtual machine, such as virtual machine 106, is performed through a combination of observation and inference. More particularly, the technique involves observing a non-virtualized timer or real time clock having sufficient granularity to detect a time distortion anomaly. That is, the non-virtualized timer must be updated with sufficient frequency such that time intervals during which a virtual machine is using a resource may be distinguished from time intervals during which the virtual machine is not using the resource, as will be explained in more detail below. A readily available non-virtual timer having sufficient granularity is a time stamp register (TSR) commonly found in modern CPUs, such as the TSC register present in Intel's x86 processor chipset, which is incremented at approximately the clock frequency of the CPU. Although the TSC register may be virtualized by default by the VMM 132, the VMM 132 typically may be configured to provide for access to the non-virtual TSC register through communication paths 138 and 140. It should be understood, however, that other non-virtual timers or registers which are incremented at a sufficiently short time interval to detect time distortion anomalies also are contemplated and within the scope of this invention. Based on the observation of the non-virtualized timer, the virtual machine 106 may infer an elapsed resource usage time that reflects the actual usage of the resource.

Figure 2A:
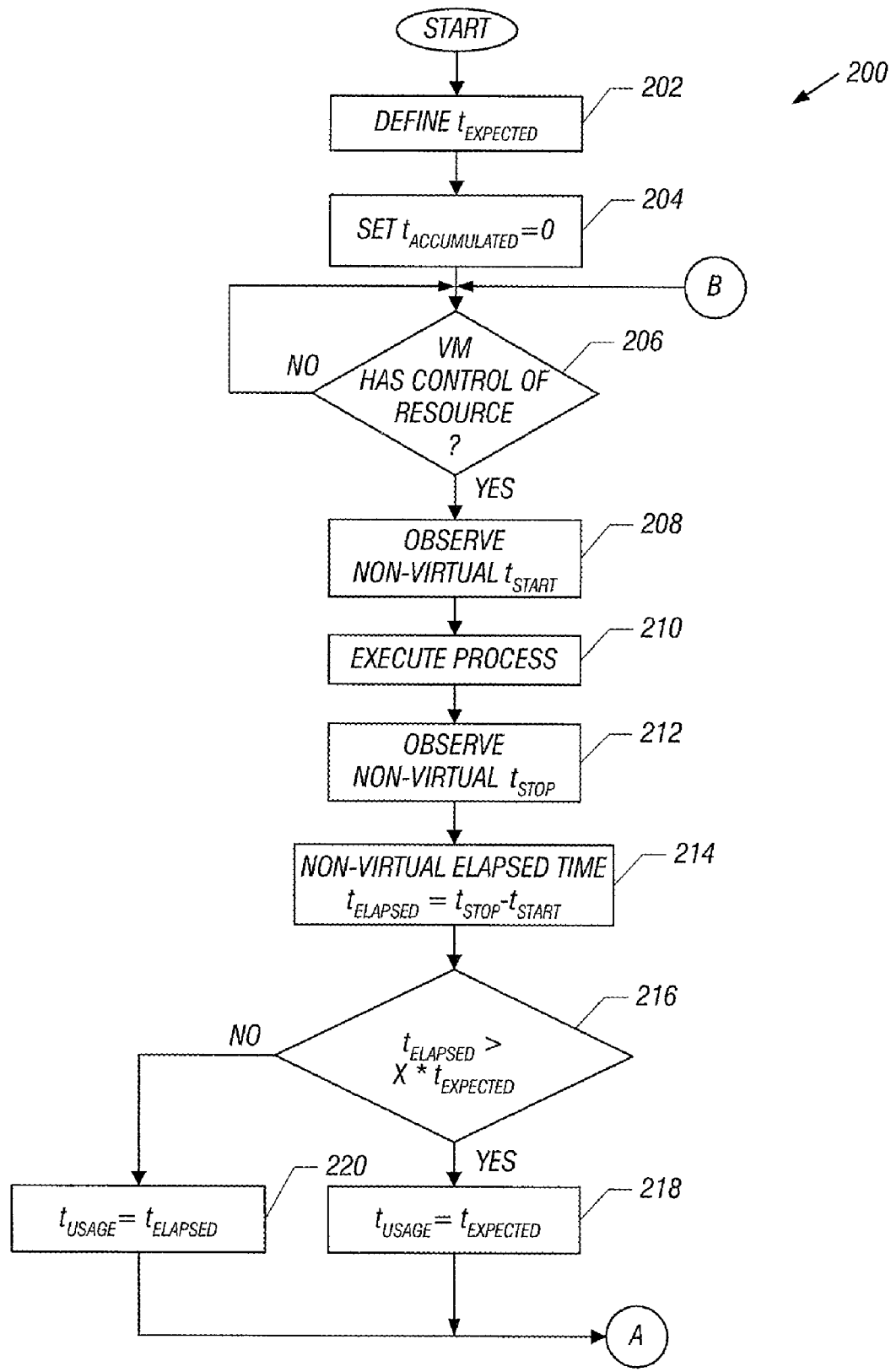
FIGS. 2A and 2B are a flow diagram of an exemplary resource usage time accounting technique according to an embodiment of the invention.
Figure 2B:
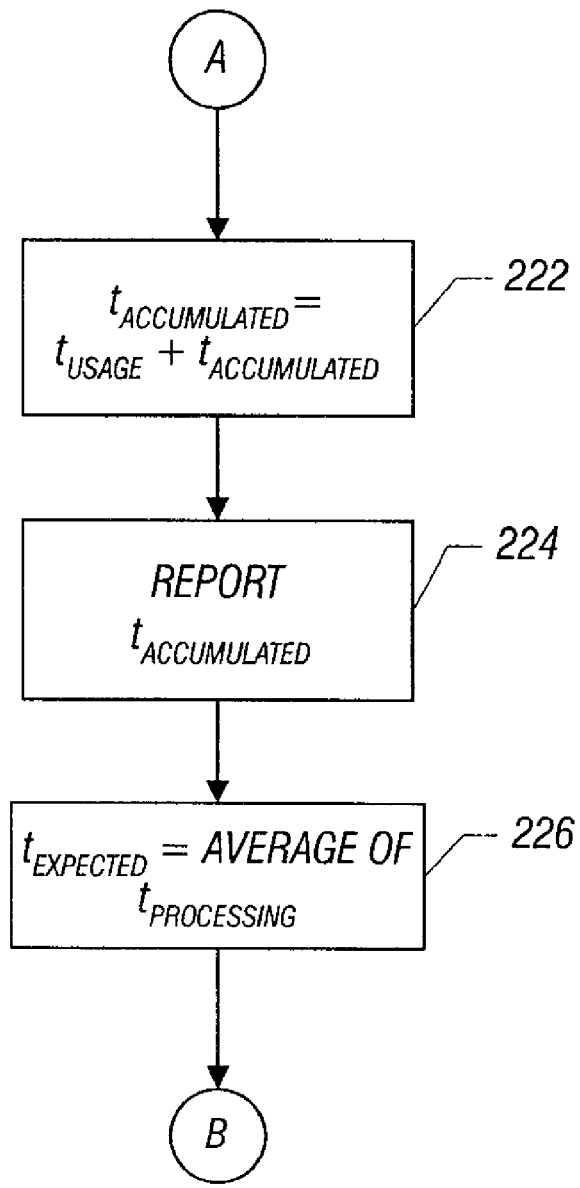

An exemplary embodiment of a technique 200 for accounting for resource usage time is shown in the flow diagram 200 of FIGS. 2A and 2B. Referring to FIGS. 2A and 2B in conjunction with FIG. 1, each virtual machine, such as virtual machine 106, includes a time accounting logic 134 to account for resource usage time by the virtual machine 106. The time accounting logic 134 may be an independent application, such as a performance tool, or it may be included in one or more applications 116 and/or drivers 120 or may even be part of the operating system 118 in embodiments in which the operating system 118 may be modified.

In the embodiment illustrated in FIGS. 2A and 2B, logic 134 accounts for resource usage time by virtual machine 106 (usage of CPU 124, for example) by executing a process or performing a computation having an expected execution time and determining an elapsed execution time based on observing a non-virtual timer 136 (e.g., the TSC register of CPU 124) both at the start and completion of execution of the known process. In one embodiment, the timer 136 is incremented at the clock frequency of the CPU 124, and, thus, has sufficient granularity so that time distortion anomalies can be detected. By repeatedly executing the process and determining the elapsed execution time, the logic 134 may establish an average of the time that it takes to execute the process. Establishing an average time compensates for iteration to iteration variations in the determined elapsed time which may otherwise occur due to unpredictable factors, such as cache and TLB misses and servicing of interrupts by the operating system. The logic 134 then sums the elapsed execution times to determine the total accumulated time that the virtual machine 106 had access to the CPU 124.

More particularly, and with reference to FIGS. 2A and 2B, the initial starting conditions of the logic 134 include a predefined, expected execution time, $t_{expected}$, of a computational process (block 202), and an initial accumulated resource usage time, $t_{accumulated}$, for the virtual machine 106 having a "0" value (block 204). The executed process may be, for example, any type of predefined routine or computation having an expected execution time of limited duration. In one embodiment of the invention, the expected execution time is expressed as the number of CPU cycles used to execute the process. In addition, the process may consume a sufficiently small number of CPU cycles such that execution of the process or performance of the computation may be distinguished from events which result in control of the processing resource being removed from the virtual machine 106. For instance, approximately one million CPU cycles may be required to switch control of the CPU 124 from virtual machine 106 to virtual machine 108. A process or computation which consumes ten to hundred times fewer CPU cycles (e.g., 500 cycles, for instance) is easily distinguishable. Thus, if the observed elapsed time interval is much greater (e.g., by a factor of ten to one hundred, for instance) than the expected execution time, then the virtual machine 106 may assume that it was not using the CPU 124 for the entire observed time interval and thus infer a usage time, as will be explained below.

Referring again to FIGS. 2A and 2B, upon being granted access to the processing resources of the physical machine 100 by the VMM 132 (diamond 206), the virtual machine 106 observes a start time, $t_{start}$, by, for instance reading the non-virtual timer 136 (block 208). The virtual machine 106 may access the timer 136 through the VMM 132 and communication paths 138, 140. The virtual machine 106 then executes the known process (block 210). Upon completion of execution of the known process, the virtual machine 106 observes a stop time, $t_{stop}$, by reading the timer 136 (block 212) and then determines an elapsed time, $t_{elapsed}$, based on the difference between the observed times, $t_{stop}$ and $t_{start}$ (block 214). In accordance with the logic 134, the virtual machine 106 compares the observed elapsed time, t to the expected time, $t_{expected}$ (diamond 216). If the observed elapsed time, $t_{elapsed}$, exceeds the expected time, $t_{expected}$, by a predefined amount (such as by a factor "X" of 10 to 100), then the virtual machine 106 may assume that it was not using the CPU 124 for the entire observed time interval, $t_{elapsed}$. In such a case, and in accordance with the logic 134, the virtual machine 106 discards the observed elapsed time (because it is not representative of the actual time during which the virtual machine 106 used the processing resource) and instead assumes a usage time, $t_{usage}$, of $t_{expected}$ (block 218). If, however, the observed elapsed time, $t_{elapsed}$ does not exceed $t_{expected}$ by a predefined amount, then the virtual machine 106 assumes a resource usage time, $t_{usage}$ that is equal to the observed elapsed time, $t_{elapsed}$ (block 220).

The virtual machine 106 then determines an accumulated resource usage time, $t_{accumulated}$, by adding the usage time, $t_{usage}$, to the previously accumulated time (block 222). In some embodiments, the virtual machine 106 may then report the accumulated usage time to the user and may use the accumulated usage time to, for instance, schedule resource usage among the various virtual machines, provide a performance report, calculate an amount to bill a customer for resource usage, etc. (block 224). In other embodiments, the accumulated time may simply be stored and then provided to the user in response to a query.

In the embodiment of the time accounting technique 200 implemented by the logic 134 illustrated in FIGS. 2A and 2B, the expected time, $t_{expected}$, to complete execution of the known process may be updated by maintaining a running average of the determined processing times (block 226). In this manner, the expected time may be more closely representative of the actual time required to execute the known process. The logic 134 may return to diamond 206 of the technique 200 to determine whether the virtual machine 106 still has control of the processing resource. The logic 134 then repeats iterations of the technique 200 to keep track of and account for the accumulated resource usage time, $t_{accumulated}$.

The tasks of FIGS. 2A and 2B may be provided in the context of information technology (IT) services offered by one organization to another organization. For example, the infrastructure (including the physical machines and virtual machines of FIG. 1) may be owned by a first organization. The IT services may be offered as part of an IT services contract, for example.

Instructions of software described above (including the VMM 132, device drivers 120, applications 116, etc. of FIG. 1) are loaded for execution on a processor (such as one or more CPUs 124 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method to account for resource usage time by a virtual machine, comprising:
    observing, by the virtual machine, a non-virtual timer upon start of execution by the virtual machine of a process using a shared resource, wherein the process has an expected time for execution;
    observing, by the virtual machine, the non-virtual timer upon completion of execution of the process to determine an elapsed non-virtual time; and
    inferring a usage time of the shared resource based on the elapsed non-virtual time, the inferring comprising:
        comparing the elapsed non-virtual time to the expected time;
        using the expected time to derive the usage time if the elapsed non-virtual time exceeds the expected time by a predefined amount; and
        using the elapsed non-virtual time to derive the usage time if the elapsed non-virtual time does not exceed the expected time by the predefined amount.

2. The method as recited in claim 1, comprising:
    repeatedly executing the process using the shared resource;
    observing, by the virtual machine, the non-virtual timer upon each start and each completion of execution of the process to determine a plurality of elapsed non-virtual times; and
    inferring an accumulated usage time of the shared resource based on the plurality of elapsed non-virtual times.

3. The method as recited in claim 2, wherein the act of inferring the accumulated usage time comprises:
    comparing each elapsed non-virtual time with the expected time;
    selecting the expected time as the usage time for the corresponding execution of the process if the elapsed non-virtual time exceeds the expected time by the predefined amount, else selecting the elapsed non-virtual time as the usage time for the corresponding execution of the process; and
    summing the selected usage times to obtain the accumulated usage time of the shared resource.

4. The method as recited in claim 3, further comprising:
    determining an average time from the selected usage times; and
    updating the expected time with the average time.

5. The method as recited in claim 3, further comprising calculating a user's bill for resource usage based on the accumulated usage time.

6. The method as recited in claim 3, further comprising scheduling usage of the shared resource based on the accumulated usage time.

7. The method of claim 1, further comprising providing information technology services, wherein the observing tasks and the determining task are part of the information technology services.

8. A physical machine, comprising:
    a processing resource;
    a non-virtual timer;
    a plurality of virtual machines that share the processing resource, each of the virtual machines including time accounting logic configured to:
        observe the non-virtual timer to determine a non-virtual elapsed time between the start of usage of the processing resource to perform a computation and the completion of usage of the processing resource to perform the computation, wherein the computation has an expected time for performance; and
        determine a usage time of the processing resource based on the observed elapsed time, the determining including:
            comparing the elapsed time and the expected time;
            selecting the expected time as the usage time if the elapsed time exceeds the expected time for performance by a predefined amount; and
            using the elapsed time to derive the usage time if the elapsed time does not exceed the expected time for performance by the predefined amount.

9. The physical machine as recited in claim 8, wherein the time accounting logic is further configured to determine an accumulated usage time by repeatedly determining the usage time of the processing resource for each instance that the computation is performed.

10. The physical machine as recited in claim 8, wherein the non-virtual timer is to be incremented at a clock frequency of the processing resource.

11. The physical machine as recited in claim 8, wherein the non-virtual timer is a time stamp register of the processing resource.

12. An article comprising at least one computer-readable storage medium containing instructions that when executed by a processor-based system cause the processor-based system to:
    observe, by a virtual machine, a non-virtual elapsed time during which the virtual machine performs a computation using a shared processing resource, wherein the performance of the computation has an expected execution time; and
    infer a processor usage time based on the observation, the inferring comprising:
        comparing the observed non-virtual elapsed time with the expected execution time;
        using the observed non-virtual elapsed time to produce the processor usage time if the observed non-virtual elapsed time does not exceed the expected execution time by a predefined amount; and
        using the expected execution time to produce the processor usage time if the observed non-virtual elapsed time exceeds the expected execution time by the predefined amount.

13. The article as recited in claim 12, wherein the instructions when executed cause the processor-based system to determine an accumulated processor usage time based on repeatedly inferring a processor usage time for each corresponding performance of the computation.

14. The article as recited in claim 13, wherein the instructions when executed cause the processor-based system to update the expected execution time based on an average inferred usage time for each instance that the virtual machine infers a usage time.

15. The article as recited in claim 12, wherein the instructions when executed cause the virtual machine to observe a time stamp register of the shared processing resource upon starting and completing performance of the computation, where observing the time stamp register provides the non-virtual elapsed time.

16. The article of claim 12, wherein observing the non-virtual elapsed time is based on observing a non-virtual timer.

\* \* \* \* \*